W. L. B. CUSHING & G. A. FLOOD.
MEANS FOR LOCKING STEERING HEADS OF AUTOMOBILES.
APPLICATION FILED JAN. 26, 1916.

1,205,861.

Patented Nov. 21, 1916.

Inventors
William L. B. Cushing
and George A. Flood,
By Franklin H. Hough
Attorney Witnesses
Wm. F. Doyle
L. R. Fiedler

UNITED STATES PATENT OFFICE.

WILLIAM L. B. CUSHING AND GEORGE A. FLOOD, OF LOS ANGELES, CALIFORNIA.

MEANS FOR LOCKING STEERING-HEADS OF AUTOMOBILES.

1,205,861.                   Specification of Letters Patent.       Patented Nov. 21, 1916.

Application filed January 26, 1916. Serial No. 74,455.

*To all whom it may concern:*

Be it known that we, WILLIAM L. B. CUSHING and GEORGE A. FLOOD, citizens of the United States, residing at Los Angeles, in the county of Los Angeles and State of California, have invented certain new and useful Improvements in Means for Locking Steering-Heads of Automobiles; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in means for locking the steering head of automobiles and it relates particularly to the application of a locking mechanism to that type of steering head employed in the Ford automobile.

The invention has for its object, among others, the provision of locking mechanism so arranged with reference to the steering head as to adapt the use of a tumbler lock of any of the well known forms of construction for throwing into engagement with the interior peripheral gear of the box or bowl of the steering head of a locking member provided with teeth adapted to engage the teeth of the interior gear and also simultaneously engage teeth of the gear wheels contained within the chamber.

The invention has for a further object the provision of means whereby the locking member may be thrown into or out of engagement with the teeth of the gear wheel and interior gear of the box by means of a worm gear connected with locking member and so positioned with reference to the locking mechanism as to adapt it, by one complete revolution of the locking key, to be thrown into or out of its locking position so as to permit the key to be withdrawn from the lock when the member is in its locking or unlocking position.

To these ends and to such others as the invention may pertain, the same consists in the novel construction and in the peculiar arrangement, combination and adaptation of parts, all as will be more fully hereinafter described, shown in the accompanying drawings and then specifically defined in the appended claim.

Figure 1:
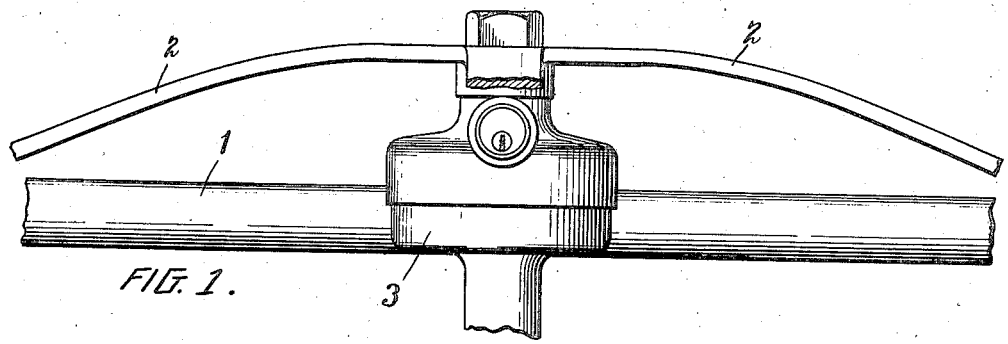
Figure 2:
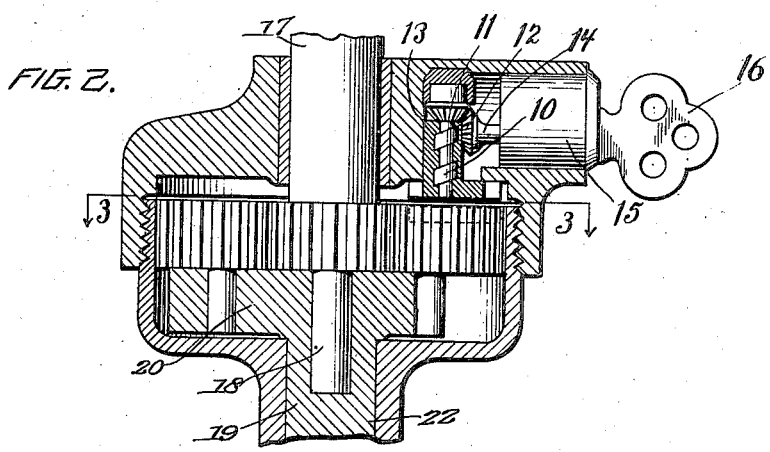
Figure 3:
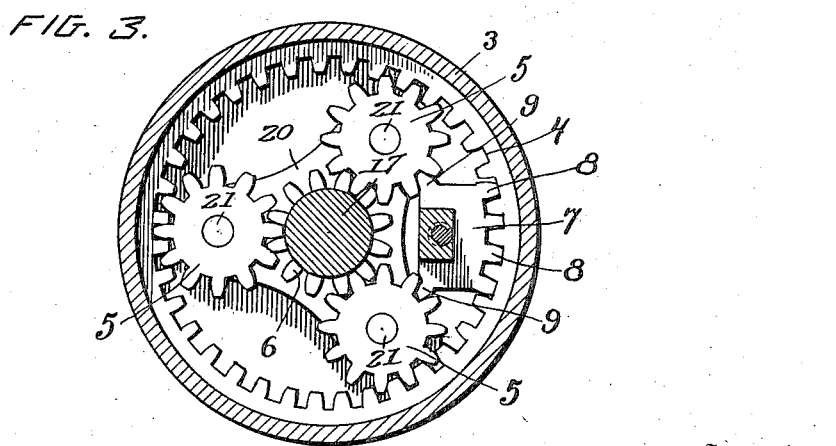

Our invention is illustrated in the accompanying drawings which, with the numerals of reference marked thereon, form a part of this specification and in which drawings:

Figure 1 is a side elevation of the steering head and wheel of a Ford automobile. Fig. 2 is a central vertical section through the steering head and locking mechanism, and Fig. 3 is a top plan view taken on line 3—3 of Fig. 2.

Reference now being had to the details of the drawings by numeral, 1 designates the rim of the steering wheel, 2, 2 the spokes, 3 a steering head which is provided with an interior peripheral gear 4 which engages the teeth of the wheels 5, 5 and also engage the teeth of the power wheel 6 upon the steering shaft.

7 is a locking member comprising a metallic plate having on its outer edge teeth 8, 8 for engagement with the teeth of the interior gear 4, the inner corners of the said locking member being provided with lugs or extensions 9, 9 adapted to be thrown into or out of engagement with the teeth of two of the wheels 5.

10 is a worm gear shaft, connected at its lower end with the locking member 7 and at its upper end provided with a beveled gear 11 adapted to engage with the beveled pinion 12, said shaft being inclosed within a chamber provided with the vertically disposed block 13.

The beveled pinion 12 is carried at the inner end of a stub shaft 14, which is loosely sleeved within the lock cylinder 15 and is adapted to be rotated within said cylinder by the turning of the key 16, the turning of which key in one direction will serve to cause the locking member to be raised out of engagement, and forced down into its locking position by the turning of the key in the opposite direction. It will be noted that in effecting either the locking or unlocking of the gears, a complete revolution of the key is required, so that the key will be in position to permit its withdrawal from the lock when the locking member is either in its locked or unlocked position.

The power wheel 6 is rigidly mounted or is formed as an integral part of the power or stub shaft 17, forming the upper portion of the steering post. Said stub shaft 17 has mounted at its upper end the steering wheel and is reduced as shown at 18 at its lower end and is adapted to be revolubly mounted in the upper end of the lower member 19 of the steering shaft, said member 19 being provided with a spider 20 in which are mounted pins 21 on which the wheels 5, 5 are mounted to revolve with their teeth in engagement with the internal gear 4 of the steering head and each also is in engagement with the power wheel 6.

The steering head in which the above mentioned parts are adapted to operate in the construction shown is a cast cup-shaped member 3 provided with a bearing 22 in which the lower member 19 of the steering shaft is adapted to revolve. The steering post casing (not shown) is mounted on and extends from the member 3 and is intended to house the steering rod and other rods, not shown.

The operation of the device in part is as follows:—The shaft 19 is operated in one direction or the other by the steering wheel 6 in mesh with the gears 5, 5, the latter being mounted on the spider 20 and in mesh with the gear 4 will, when the shaft 17 is revolved, cause the shaft 19 to revolve at a lower rate but with increased power. My improved locking mechanism is designed to lock two of the gears 5, 5 against any movement in either direction and thereby lock the wheels of the automobile in a position that will prevent the movement of the machine in other than a circular direction and thereby prevent theft of the machine.

The steering gear shown is that which is employed in connection with the Ford automobile and forms no part of the present invention, being shown merely to illustrate the application of our locking mechanism thereto. In applying the invention, it will simply be necessary to remove the screw-threaded cap or cover of the gear bowl and to substitute therefor the cap 20 which contains our locking member and its actuating means.

While in the accompanying drawings we have shown a specific form of lock, it will be at once evident that other forms of lock adapted to the purpose may be employed.

What we claim to be new is:—

In a steering head locking mechanism, the combination with a gear case or bowl provided with an interior peripheral gear and having gear wheels adapted to engage said peripheral gear, of a locking member adapted to be moved into engagement with the peripheral gear and two of the gear wheels by means of a vertically disposed worm gear shaft rotated by engagement of a beveled gear at the upper end of the shaft with a beveled gear pinion carried at the inner end of a horizontal shaft adapted to be rotated by a locking key, substantially as described and for the purpose specified.

In testimony whereof we hereunto affix our signatures in presence of two witnesses.

WILLIAM L. B. CUSHING.
GEORGE A. FLOOD.

Witnesses:
   FRANKLIN H. HOUGH,
   WM. F. DOYLE.